United States Patent
Barry et al.

(10) Patent No.: US 7,523,898 B1
(45) Date of Patent: Apr. 28, 2009

(54) WIRE HOLDER WITH SINGLE STEP INSTALLATION INTO T-SHAPED HOLE IN SUPPORT SUBSTRATE

(75) Inventors: Keith Barry, San Diego, CA (US);
Daniel Ebbeling, San Diego, CA (US);
Eugene Kubota, San Diego, CA (US);
Dennis McCray, San Diego, CA (US);
Ryoji Naito, San Diego, CA (US);
Mario Sanchez, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/023,426

(22) Filed: Jan. 31, 2008

(51) Int. Cl.
*F16B 15/00* (2006.01)

(52) U.S. Cl. .................. 248/71; 248/73; 248/74.1; 174/164

(58) Field of Classification Search ............. 248/71, 248/69, 73, 74.2, 74.1, 546; 174/164
See application file for complete search history.

(56) References Cited

U.S. PATENT DOCUMENTS

| | | | | |
|---|---|---|---|---|
| 4,023,758 A | * | 5/1977 | Yuda | .............. 248/73 |
| 4,143,577 A | * | 3/1979 | Eberhardt | .............. 411/548 |
| 4,564,163 A | * | 1/1986 | Barnett | .............. 248/71 |
| 4,566,660 A | | 1/1986 | Anscher | |
| 4,669,688 A | | 6/1987 | Itoh | |
| 4,681,288 A | | 7/1987 | Nakamura | |
| D292,554 S | | 11/1987 | Yagi | |
| D293,205 S | | 12/1987 | Nakano | |
| D301,684 S | | 6/1989 | Herzog | |
| 4,840,334 A | * | 6/1989 | Kikuchi | .............. 248/73 |
| D302,938 S | * | 8/1989 | Fujioka | .............. D8/356 |
| 4,917,340 A | * | 4/1990 | Juemann et al. | ........ 248/74.2 |
| 6,220,554 B1 | * | 4/2001 | Daoud | ........ 248/74.1 |
| 6,669,149 B2 | | 12/2003 | Akizuki | |
| 6,749,157 B2 | * | 6/2004 | Takeuchi | .............. 248/71 |
| 6,923,406 B2 | * | 8/2005 | Akizuki | .............. 248/71 |
| 7,182,299 B2 | | 2/2007 | Takeuchi | |
| 2002/0011542 A1 | * | 1/2002 | Winton, III | ........ 248/74.1 |

\* cited by examiner

*Primary Examiner*—Anita M King
(74) *Attorney, Agent, or Firm*—John L. Rogitz

(57) ABSTRACT

A new wire holder design. The holder is installed into a T-shaped or L-shaped hole in substrate such as a sheet metal, printed wiring board, etc. using only a single installation motion. The holder holds wires in place. Because it requires only a single installation motion the holder is easily installed and furthermore cannot rotate once installed. The holder protrudes only about a millimeter below the substrate.

17 Claims, 2 Drawing Sheets

US 7,523,898 B1

WIRE HOLDER WITH SINGLE STEP INSTALLATION INTO T-SHAPED HOLE IN SUPPORT SUBSTRATE

FIELD OF THE INVENTION

The present invention relates generally to wire holders that requires only a single installation motion to engage with a non-round hole such as a T-shaped hole in a substrate such as a TV circuit board.

BACKGROUND OF THE INVENTION

To hold wires on substrates such as sheet metal surfaces and printed wiring boards (PWB) in electrical components such as TVs, wire clamps can be used. The wires typically are engaged with the clamp and then the clamp is advanced into a hole in the substrate.

As understood herein, in large-scale manufacturing it is desirable to minimize the number of movements that must accompany engaging the clamp with the substrate. A round hole can be used to enable a wire clamp that has an engagement post to be installed in the hole using a single downward pushing movement, but as understood herein such clamps can undesirably rotate in the round holes.

To prevent clamp rotation after installation, non-round holes such as T-shaped or L-shaped holes may be used. As recognized by the present invention, however, clamps designed for installation in such holes typically require at least two installation movements, namely, a downward push into the hole (typically into the stalk of the "T" or "L") followed by either a rotating or sliding motion of the clamp (typically into the cross arm of the "T" or "L"). Complicating the situation is that little clearance often exists below the substrate, so that the portion of the clamp that is pushed through the hole typically must not protrude any more than a minimal distance below the substrate. Still further, as understood herein, for robustness a clamp that requires only a single installation movement in a T-shaped hole and that does not protrude more than a minimal distance below the substrate ideally would work with existing holes in which other clamps may also be used.

SUMMARY OF THE INVENTION

A method includes engaging one or more wires with a wire holder, and using one and only one installation movement, engaging the wire holder with a T-shaped hole of a substrate. The substrate may be part of a TV.

In another aspect, a wire holder engageable with a hole of a substrate includes opposed side walls bounded by a bottom support and two top flaps separated from each other by a slit through which a wire may be moved. The side walls, bottom support, and top flaps define a wire enclosure. Each top flap is joined to a respective side wall by a respective flap hinge, and the top flaps extend toward each other and are slightly canted downward from their respective side walls toward the bottom support such that when a wire is slid through the slit into the enclosure, the top flaps deflect down and away from each other. The top flaps move back toward each other under the influence of material bias once the wire clears the top flaps.

In yet another aspect, a wire holder engageable with a hole a substrate includes an anti-rotation guide formed on a bottom support that partially defines a wire enclosure. The guide defines two parallel opposed surfaces that are parallel to the bottom support. Two clips depend down from the bottom support and straddle the guide. Each clip is spaced from the guide by a respective space. Each clip terminates in a respective free end and pivots about a respective hinge point on a side of the substrate that is opposite the side of the substrate with which the free ends are engaged.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
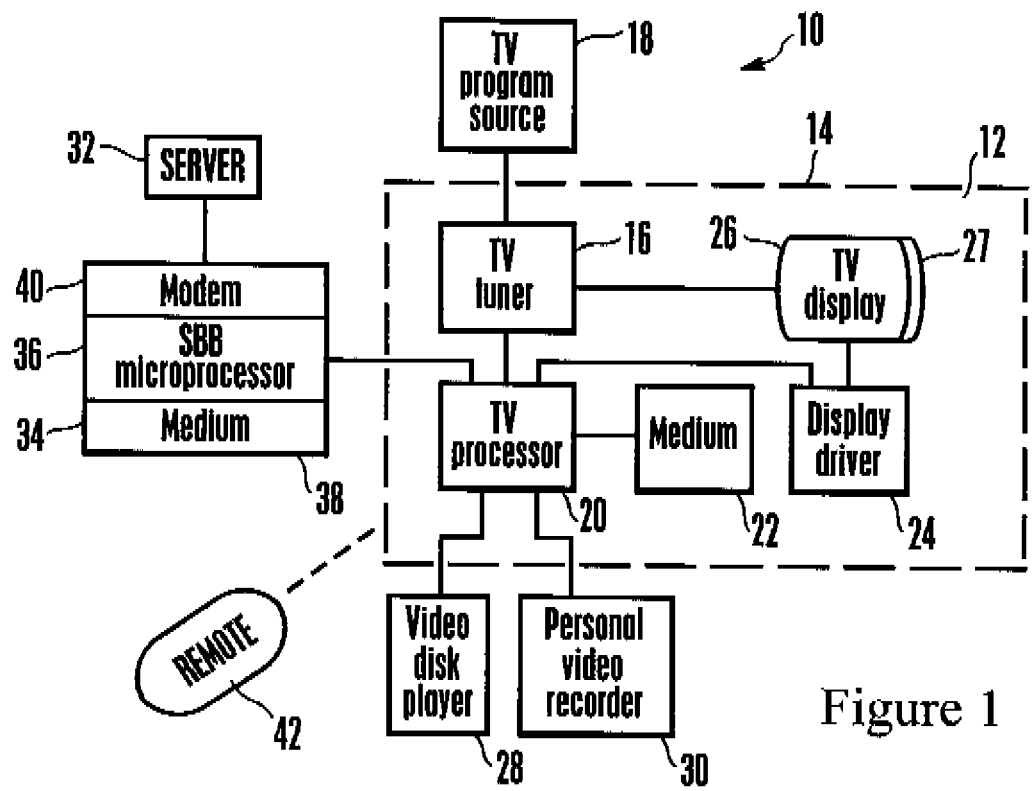
FIG. 1 is a non-limiting block diagram of an example TV system in which the present wire holder may be used.

It is to be understood that while for ease of disclosure relative terms of direction such as "upper", "lower", "top", "bottom", etc. are used, these terms are not limiting. For example, the below-described wire holder might be engaged from below a substrate instead of from above it as shown in the drawings, i.e., it might be positioned upside-down from the orientation shown in the drawings.

Referring initially to FIG. 1, a system is shown, generally designated 10, which includes a television 12 defining a TV chassis 14 and receiving, through a TV tuner 16 from a cable or satellite or other source or sources 18 audio video TV programming. The tuner 16 may be contained in the set box described below. The system 10 is a non-limiting example of a system employing a substrate with which the below-described wire holder can be engaged.

The TV 12 typically includes a TV processor 20 accessing a tangible computer readable medium 22. The tangible computer readable medium 22 may be established by, without limitation, solid state storage, optical or hard disk storage, etc. The medium 22 may store software executable by the TV processor 20 to, e.g., control a display driver 24 that drives a TV visual display 26 in accordance with one or more settings such as brightness, contrast, and the like that may be stored in, e.g., the medium 22. The display 26 may be a flat panel matrix display, cathode ray tube, or other appropriate video display, and typically is associated with one or more audio speakers 27. The medium 22 may also contain additional code including backend software executable by the TV processor 20 for various non-limiting tasks. One or more of the processors described herein may execute the logic below, which may be stored as computer code on one or more the computer readable media described herein.

In the non-limiting embodiment shown in FIG. 1 the TV 12 may receive programming from external components such as but not limited to a video disk player 28 such as a Blu-Ray or DVD player and a personal video recorder (PVR) 30 that can contain audio-video streams on a hard disk drive.

Additionally, the TV 12 can communicate via a network such as the Internet with a server 32. To this end, the TV 12 may be Internet-enabled, although it is to be understood that the server 32 may be combined with the TV program source 18 when the source 18 is a remote entity accessible over a wide area network, in which case no modem need be provided, with the TV sending signals through a reverse link to the source 18/server 32.

In the non-limiting embodiment shown, the server 32 is separate from the source 18 and the TV 12 communicates with the server 32 through a set-back box (SBB) 34. In some implementations a set-top box (STB) may be used, and the SBB/STB may itself include the tuner 16 or otherwise communicate with the source 18.

In any case, the SBB 34 shown in FIG. 1 may include a SBB processor 36 and SBB computer readable medium 38. The SBB 34 may also include a network interface such as but not limited to a modem 40 to communicate with the server 32 over the Internet. In other implementations the modem 40 may be incorporated into the TV chassis 14.

A wireless remote control 42 can be provided to input commands such as the below-described subtitle position commands into the system 10. The remote control 42 can be a conventional TV remote control or other portable hand-held device.

The present wire holder may be engaged with the system described above, such as with sheet metal parts of the TV or PWBs of the TV. Accordingly, for an understanding of the wire holder and now referring to FIG. 2, a wire holder 44 is shown which is formed with a wire enclosure 46 through which wires can pass to constrain or clamp the wires. The wire enclosure 46 is bounded by preferably flat opposed co-parallel side walls 48 that are unitarily joined at their bottom ends by a bottom support 50 that is generally orthogonal to the side walls 48. In some embodiments the internal surface of the bottom support 50 can be centrally formed with a concavity 52 to accommodate a wire bundle for purposes to be shortly disclosed.

In contrast, to substantially complete the enclosure 46, at their upper ends the side walls 48 unitarily join with respective top flaps 54. Each top flap 54 may be joined to its respective side wall 48 by a respective flap hinge 56 that may be established by a relatively thin (compared to the thickness of the side walls 48 and top flaps 54) pieces of material, with the result of the relative thinness of the flap hinges 56 being that a small space 58 is formed between each top flap 54 and its respective side wall 48.

Figure 2:
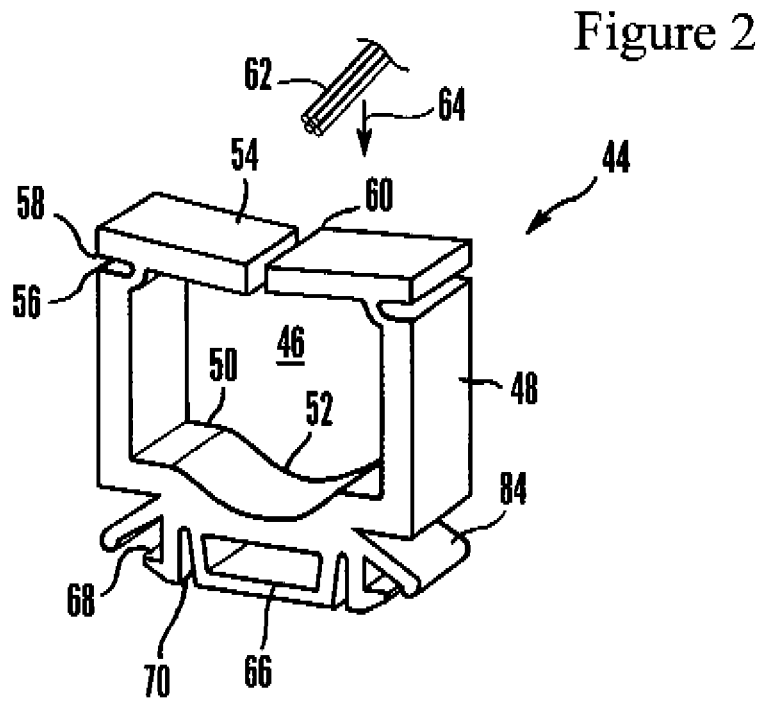
FIG. 2 is a perspective view of the present wire holder.

As shown in FIG. 2, the top flaps 54 extend toward each other and are spaced from each other by a slit 60 that is centrally formed on the holder 44, i.e., on the axis (which would be the vertical axis looking down on FIG. 3) of the holder. The top flaps 54 may be slightly canted downward as shown from their respective side walls 48 toward the bottom support 50, and a wire or wires 62 can be slid through the slit 60 into the enclosure 46 as indicated by the arrows 64, with the top flaps deflecting down and away from each other to effectively enlarge the slit 60 and thus better accommodate reception of a bundle of wires or a single thick wire. Once the wire or wires clear the top flaps 54, the top flaps 54 are materially biased to reassume the configuration shown in FIG. 2. It may now be appreciated that the concavity 52 can accommodate wires that have been urged through the slit 60 so that the top flaps can clear the wires and reassume the substantially closed configuration shown. Thus, the wires 62 are simply pushed through the silt into the enclosure 46 without requiring the separate the operate and closing of a clip.

The preferred non-limiting structure for engaging the holder 44 with a hole of a substrate is formed on the bottom support 50 opposite the concavity 52. More specifically and now cross-referencing FIGS. 2 and 3, an anti-rotation guide 66 is centrally formed on the outer surface of the bottom support 50. The guide 66 preferably is somewhat elongated in the same dimension as is the bottom support, and may be generally parallelepiped-shaped as shown or may assume other shapes such as trapezoidal. In any case, the guide 66 defines at least two parallel opposed surfaces that are orthogonal to the side walls 48 of the wire holder 44 as shown. Furthermore, as best shown in FIG. 3 the guide 66 may be hollow to minimize the amount of material required to form the wire holder 44.

Two leg-like clips 68 depend down from the bottom support 50 and straddle the guide 66 as shown. Each clip 68 is slightly spaced from the guide 66 by a respective space 70. As best shown in FIG. 3, opposite the bottom support 50 each clip 68 terminates in a respective bevelled or ramped or rounded free end 72. It may now be appreciated that as the holder 44 is advanced into a hole 74 of a substrate 76, the free ends 72, being contoured as disclosed, ride against the periphery of the hole, urging the clips 68 inwardly toward the guide 66, with the spaces 70 accommodating this movement of the clips 68. Once the free ends 72 clear the periphery of the hole, the material resiliency of the clips 68 causes them to move outwardly into the configuration shown in FIG. 3, wherein an upper flat lip 78 of each clip 68 abuts the bottom surface of the substrate 76 as shown to retain the wire holder 44 in the hole 74.

It may also be appreciated that the guide 66 prevents rotation of the holder 44 in the hole 74. This remains true even when the hole 74 is T-shaped as shown, or is L-shaped or otherwise includes at least two orthogonal hole segments. By way of clarity and not limitation, the particular hole 74 shown in FIGS. 3 and 4 is T-shaped, having a stalk 80 into which the guide 66 and one of the clips 68 are advanced, and a cross-channel 82, into which parts of the guide 66 and the other clip 68 may be advanced, with the guide 66 cooperating with the walls of the stalk 80 to prevent rotation of the wire holder 44 in the hole 74.

Figure 3:
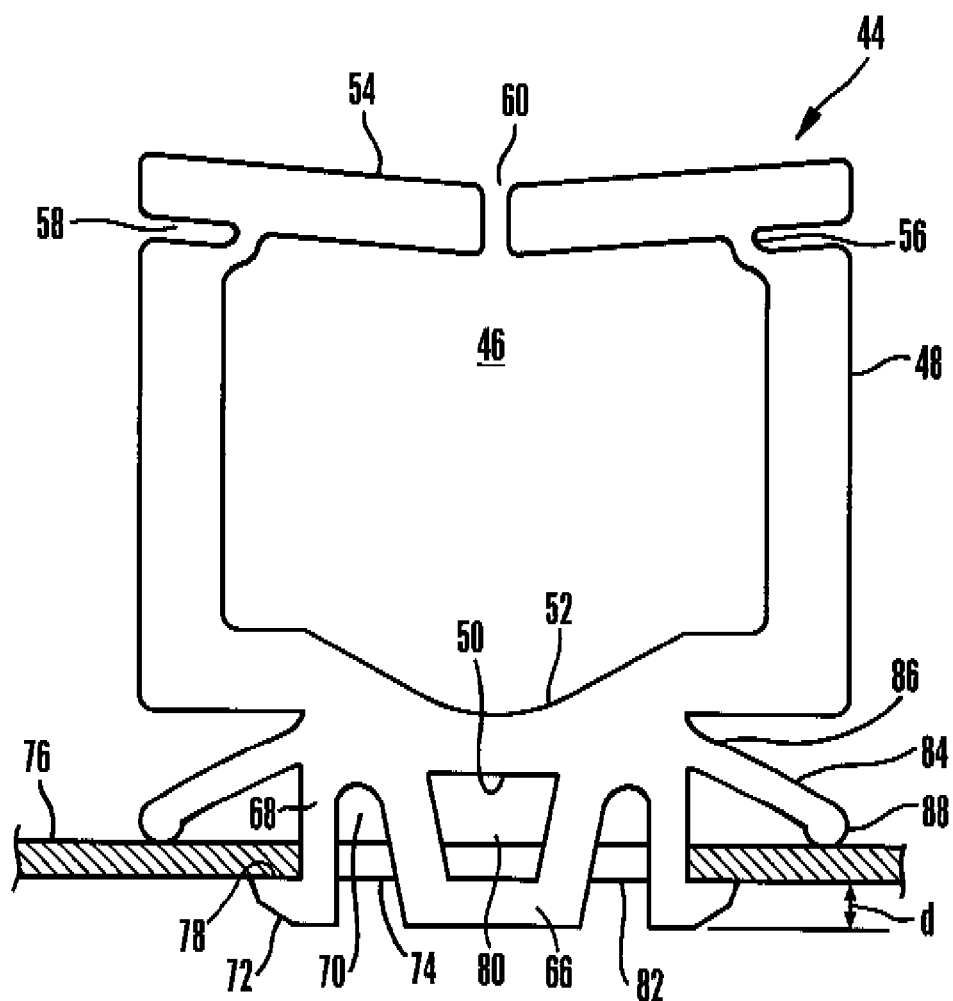
FIG. 3 is a front elevational view of the holder installed in a substrate.
Figure 4:
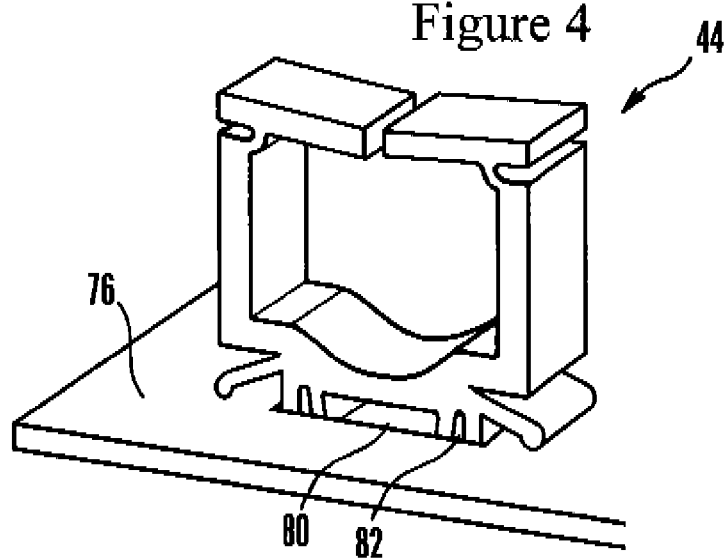
FIG. 4 is a perspective view of the holder installed in a substrate.

With further respect to FIG. 3, the hinge point of each clip 68 is just above the respective space 70, and thus is above the substrate 76. This facilitates an advantageously minimal protrusion distance "d" of the holder 44 below the substrate 76 as shown, in some embodiments on the order of a millimeter or less.

Completing the description of the substrate engaging structure of the wire holder 44, outboard of each clip 68 is a respective spring arm 84. As best shown in FIG. 3, each spring arm 84 has a respective inboard end 86 that is integral with the bottom support 50 and that establishes a hinge. Also, each spring arm 84 has a respective outboard end 88 that may be rounded and that contacts the upper surface of the substrate 76 when the wire holder 44 is engaged with the substrate. Looking down on FIG. 3, each spring arm 84 slopes downwardly and outboard from the inboard end 86 to the outboard end 88, extending in the lateral dimension to be substantially coplanar with a respective side wall 48. When the wire holder 44 is pushed into the hole 74, the spring arms 84 contact the top of the substrate and as the holder 44 is pushed further into the hole 74 to allow the clips 68 to clear the periphery of the hole, the spring arms 84 pivot about their respective inboard ends 86, with the material resiliency of the spring arms 84 exerting a force against the substrate 76 to clamp the substrate 76 between the outboard ends 88 of the spring arms 84 and the lips 78 of the clips 68. It may be appreciated that owing to this material resiliency, the spring arms 84 facilitate engagement of the wire holder 44 with substrates 76 of various thicknesses, e.g., in non-limiting embodiments substrates of between eight-tenths of a millimeter to two millimeters.

The holder 44 may be a unitary molded piece of plastic.

With the above structure in mind, the wire holder 44 may be engaged with a T-shaped or L-shaped hole 74 of a substrate 76 using one and only one movement, i.e., a simple single downward push of the wire holder 44 into the hole. The above-described structure then cooperates to securely hold the wire holder 44 in the hole without allowing the holder 44 to rotate within the hole. No further installation movement after the downward push, such as sliding or turning the holder 44 from the stalk part of the hole into the cross-bar part of the hole, is required. Indeed, the holder 44 is self-guiding; when it is aligned approximately with the hole, a force applied downward will cause the holder 44 to shift into the correct alignment.

The wire holder 44 may be used in any device where wires need to be held in place. Particularly in the case of preexisting T-shaped holes, the holder 44 facilitates easier, faster installation than a two-motion holder while performing as well as such holders. Thus, the present holder 44 may be used as a running change on existing substrates without requiring a change in hole design because it has the same footprint as two-step installation holders.

While the particular WIRE HOLDER WITH SINGLE STEP INSTALLATION INTO T-SHAPED HOLE IN SUPPORT SUBSTRATE is herein shown and described in detail, it is to be understood that the subject matter which is encompassed by the present invention is limited only by the claims.

What is claimed is:

1. A method comprising:
   engaging at least one wire with a wire holder; and
   using one and only one installation movement, engaging the wire holder with a T-shaped hole of a substrate such that the wire holder cannot rotate in the hole, wherein the wire holder defines an enclosure into which the wire is disposed, the enclosure being defined by opposed side walls bounded by a bottom support and two top flaps separated from each other by a slit through which the wire may be moved, the wire holder including:
   an anti-rotation guide formed on the bottom support, the guide defining at least two parallel opposed surfaces that are orthogonal to the side walls; and
   two clips depending down from the bottom support and straddling the guide, each clip being spaced from the guide by a respective space, each clip terminating in a respective free end and pivoting about a respective hinge point on a side of the substrate that is opposite the side of the substrate with which the free ends are engaged.

2. The method of claim 1, wherein the substrate is part of a TV.

3. The method of claim 1, wherein the movement is a downward push into the hole.

4. The method of claim 1, wherein each top flap is jointed to a respective side wall by a respective flap hinge, the top flaps extending toward each other and being slightly canted downward from their respective side walls toward the bottom support, such that when a wire is slid through the slit into the enclosure, the top flaps deflect down and away from each other, the top flaps moving back toward each other under the influence of material bias once the wire clears the top flaps.

5. The method of claim 4, wherein the bottom support is formed with a concavity to accommodate at least one wire that has been urged through the slit so that the top flaps can clear the wire.

6. The method of claim 1, wherein as the holder is advanced into the hole of the substrate, the free ends ride against a periphery of the hole, urging the clips inwardly toward the guide, with the spaces accommodating movement of the clips, material resiliency of the clips causing them to move outwardly when the free ends clear the periphery such that an upper flat lip of each clip abuts a bottom surface of the substrate to retain the wire holder in the hole.

7. The method of claim 6, wherein the holder comprises:
   a respective spring arm outboard of each clip, each spring arm having a respective inboard end that is integral with the bottom support and that establishes a hinge, each spring arm having a respective outboard end that contacts a surface of the substrate when the wire holder is engaged with the substrate, the substrate being clamped between the outboard ends of the spring arms and the clips.

8. A wire holder engageable with a hole of a substrate and comprising:
   opposed side walls bounded by a bottom support and two top flaps separated from each other by a slit through which a wire may be moved, the side walls, bottom support, and top flaps defining a wire enclosure, wherein each top flap is joined to a respective side wall by a respective flap hinge, the top flaps extending toward each other and being slightly canted downward from their respective side walls toward the bottom support, such that when a wire is slid through the slit into the enclosure, the top flaps deflect down and away from each other, the top flaps moving back toward each other under the influence of material bias once the wire clears the top flaps such that wires can be pushed through the slit into the enclosures without requiring a separate opening and closing a clip, the holder further including:
   an anti-rotation guide formed on the bottom support, the guide defining at least two parallel opposed surfaces that are orthogonal to the side walls; and
   two clips depending down from the bottom support and straddling the guide, each clip being spaced from the guide by a respective space, each clip terminating in a respective free end and pivoting about a respective hinge point on a side of the substrate that is opposite the side of the substrate with which the free ends are engaged.

9. The wire holder of claim 8, wherein the bottom support is formed with a concavity to accommodate at least one wire that has been urged through the slit so that the top flaps can clear the wire.

10. The wire holder of claim 8, wherein as the holder is advanced into the hole of the substrate, the free ends ride against a periphery of the hole, urging the clips inwardly toward the guide, with the spaces accommodating movement of the clips, material resiliency of the clips causing them to move outwardly when the free ends clear the periphery such that an upper flat lip of each clip abuts a bottom surface of the substrate to retain the wire holder in the hole.

11. The wire holder of claim 10, wherein the holder comprises:
   a respective spring arm outboard of each clip, each spring arm having a respective inboard end that is integral with the bottom support and that establishes a hinge, each spring arm having a respective outboard end that contacts a surface of the substrate when the wire holder is engaged with the substrate, the substrate being clamped between the outboard ends of the spring arms and the clips.

12. A wire holder engageable with a hole of a substrate and comprising:
   an anti-rotation guide formed on a bottom support that partially defines a wire enclosure, the guide defining at least two parallel opposed surfaces that are parallel to the bottom support, the anti-rotation guide preventing rotation of the holder in the holder in the hole; and
   two clips depending down from the bottom support and straddling the guide, the clips and the opposed surfaces all being disposed in the same transverse plane, each clip being spaced from the guide by a respective space, each clip terminating in a respective free end and pivoting about a respective hinge point on a side of the substrate that is opposite the side of the substrate with which the free ends are engaged, the clips retaining the wire holder in the hole and the guide preventing rotation of the holder in the hole.

13. The wire holder of claim 12, wherein as the holder is advanced into the hole of the substrate, the free ends ridge against a periphery of the hole, urging the clips inwardly toward the guide, with the spaces accommodating movement of the clips, material resiliency of the clips causing them to move outwardly when the free ends clear the periphery such that an upper flat lip of each clip abuts a bottom surface of the substrate to retain the wire holder in the hole.

14. The wire holder of claim 13, wherein the holder comprises:
a respective spring arm outboard of each clip, each spring arm having a respective inboard end that is integral with the bottom support and that establishes a hinge, each spring arm having a respective outboard end that contacts a surface of the substrate when the wire holder is engaged with the substrate, the substrate being clamped between the outboard ends of the spring arms and the clips.

15. The wire holder of claim 14, wherein each spring arm slopes downwardly and outboard from the inboard end to the outboard end and extends in the lateral dimension to a respective side wall such that when the wire holder is pushed into the hole, the spring arms contact the substrate and as the holder is pushed further into the hole to allow the clips to clear the periphery of the hole, the spring arms pivot about their respective inboard ends, with the material resiliency of the spring arms exerting a force against the substrate.

16. The wire holder of claim 12, further comprising:
opposed side walls bounded by the bottom support and by two top flaps separated from each other by a slit through which a wire may be moved, the side walls, bottom support, and top flaps defining the wire enclosure, wherein
each top flap is joined to a respective side wall by a respective flap hinge, the top flaps extending toward each other and being slightly canted downward from their respective side walls toward the bottom support, such that when a wire is slide through the slit into the enclosure, the top flaps deflect down and away from teach other, the top flaps moving back toward each other under the influence of material bias once the wire clears the top flaps.

17. The wire holder of claim 16, wherein the bottom support is formed with a concavity to accommodate at least one wire that has been urged through the slit so that the top flaps can clear the wire.

* * * * *